US012729636B2

(12) United States Patent
Ichimura

(10) Patent No.: US 12,729,636 B2
(45) Date of Patent: Sep. 8, 2026

(54) LUBRICATION MECHANISM

(71) Applicant: HONDA MOTOR CO., LTD., Tokyo (JP)

(72) Inventor: Yasuyuki Ichimura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 183 days.

(21) Appl. No.: 18/475,435

(22) Filed: Sep. 27, 2023

(65) Prior Publication Data

US 2025/0101893 A1 Mar. 27, 2025

(51) Int. Cl.

| | |
|---|---|
| ***F01M 11/02*** | (2006.01) |
| ***B63H 20/00*** | (2006.01) |
| ***F16C 3/02*** | (2006.01) |
| ***F16H 41/30*** | (2006.01) |
| ***F16H 57/04*** | (2010.01) |

(52) U.S. Cl.

CPC ........... *F01M 11/02* (2013.01); *B63H 20/002* (2013.01); *F16C 3/02* (2013.01); *F16H 41/30* (2013.01); *F16H 57/043* (2013.01); *F16C 2326/30* (2013.01); *F16D 2300/06* (2013.01)

(58) Field of Classification Search

CPC ......... B63H 20/002; F01M 11/02; F16C 3/02; F16C 3/023; F16D 2300/06; F16H 41/30; F16H 57/042; F16H 57/0427; F16H 57/043; F16H 57/0434; F16N 7/363; F16N 11/12; Y10T 74/19991

USPC .......................... 464/7, 16; 184/6.12; 74/492

See application file for complete search history.

(56) References Cited

U.S. PATENT DOCUMENTS

| | | | | |
|---|---|---|---|---|
| 2,926,755 | A * | 3/1960 | Kolbe | F16H 57/043 184/6.12 |
| 4,567,784 | A * | 2/1986 | Hambric | F16H 57/043 184/6.12 |
| 9,188,215 | B2 * | 11/2015 | Tage | F16H 57/043 |
| 9,422,044 | B2 * | 8/2016 | Nakamura | B63H 20/002 |
| 9,982,770 | B2 * | 5/2018 | Galab | F16H 57/043 |
| 10,352,351 | B2 * | 7/2019 | Goldstein | F16C 3/023 |
| 11,236,650 | B2 * | 2/2022 | Fukamizu | F16H 57/043 |
| 11,486,486 | B2 * | 11/2022 | Trinh | F16H 57/0423 |
| 12,084,981 | B2 * | 9/2024 | Simard-Bergeron | F16H 57/043 |
| 2007/0292272 | A1 | 12/2007 | Ide et al. | |

FOREIGN PATENT DOCUMENTS

| | | | | |
|---|---|---|---|---|
| DE | 102012004003 | A1 * | 8/2013 | F01M 1/12 |
| DE | 102013011588 | A1 * | 1/2015 | F16H 57/043 |
| JP | 2007-314045 | A | 12/2007 | |
| WO | WO-2006043008 | A1 * | 4/2006 | F16H 57/043 |

* cited by examiner

*Primary Examiner* — Josh Skroupa

(74) *Attorney, Agent, or Firm* — Rankin, Hill & Clark LLP

(57) ABSTRACT

In a lubrication mechanism including a rotating shaft, the rotating shaft includes an external member and an internal member housed inside the external member, the internal member having an internal space extending in an axial direction, a horizontal hole is formed in the internal member, the horizontal hole for communicating between the internal space and an outer peripheral surface of the internal member, the horizontal hole communicates with a lubrication flow passage for communicating with a prescribed lubrication target portion, and the external member and the internal member are made of materials with a different hardness.

10 Claims, 3 Drawing Sheets

100S
100
110
32
101
112
115
102
36a
75
103
60
36b
110S
113
116
111
114
33
34
35

LUBRICATION MECHANISM

BACKGROUND OF THE INVENTION

Field of the Invention

The present invention relates to a lubrication mechanism.

Description of the Related Art

Conventionally, technology of providing an orifice hole in a flow passage has been known as a technology for limiting a supply amount of lubrication oil (for example, refer to Japanese Patent Laid-Open No. 2007-314045). Japanese Patent Laid-Open No. 2007-314045 discloses an oil supply passage that provides an orifice, in order to limit an oil supply amount to a torque convertor.

However, a power input shaft and a power output shaft used for a reduction gear or the like are made of a high strength material such as a carburized material, and it is difficult to form a fine orifice hole.

An object of the present invention, which has been made in consideration of the above-stated circumstances, is to provide a lubrication mechanism that, by forming a rotating shaft, can establish both rigidity and moldability of the rotating shaft, by using an internal member and an external member with different hardnesses.

SUMMARY OF THE INVENTION

In order to achieve the object, one aspect of the present invention is a lubrication mechanism including a rotating shaft, the rotating shaft includes an external member and an internal member housed inside the external member, the internal member having an internal space extending in an axial direction, a horizontal hole is formed in the internal member, the horizontal hole for communicating between the internal space and an outer peripheral surface of the internal member, the horizontal hole communicates with a lubrication flow passage for communicating with a prescribed lubrication target portion, and the external member and the internal member are made of materials with a different hardness.

According to the present invention, rigidity by a member with a high hardness and moldability by a member with a low hardness can both be established.

DETAILED DESCRIPTION OF THE PREFERRED EMBODIMENTS

Configuration of an Outboard Motor Relating to an Embodiment

An embodiment of the present invention will be described with reference to the figures. Note that, in the present embodiment, an example of a case where a lubrication mechanism is applied to a lubrication mechanism of an outboard motor will be described.

Note that, within the description, descriptions of directions such as front-rear, left-right, and up-down will be the same as front-rear and left-right with respect to a traveling direction of a ship hull, unless otherwise specified.

Figure 1:
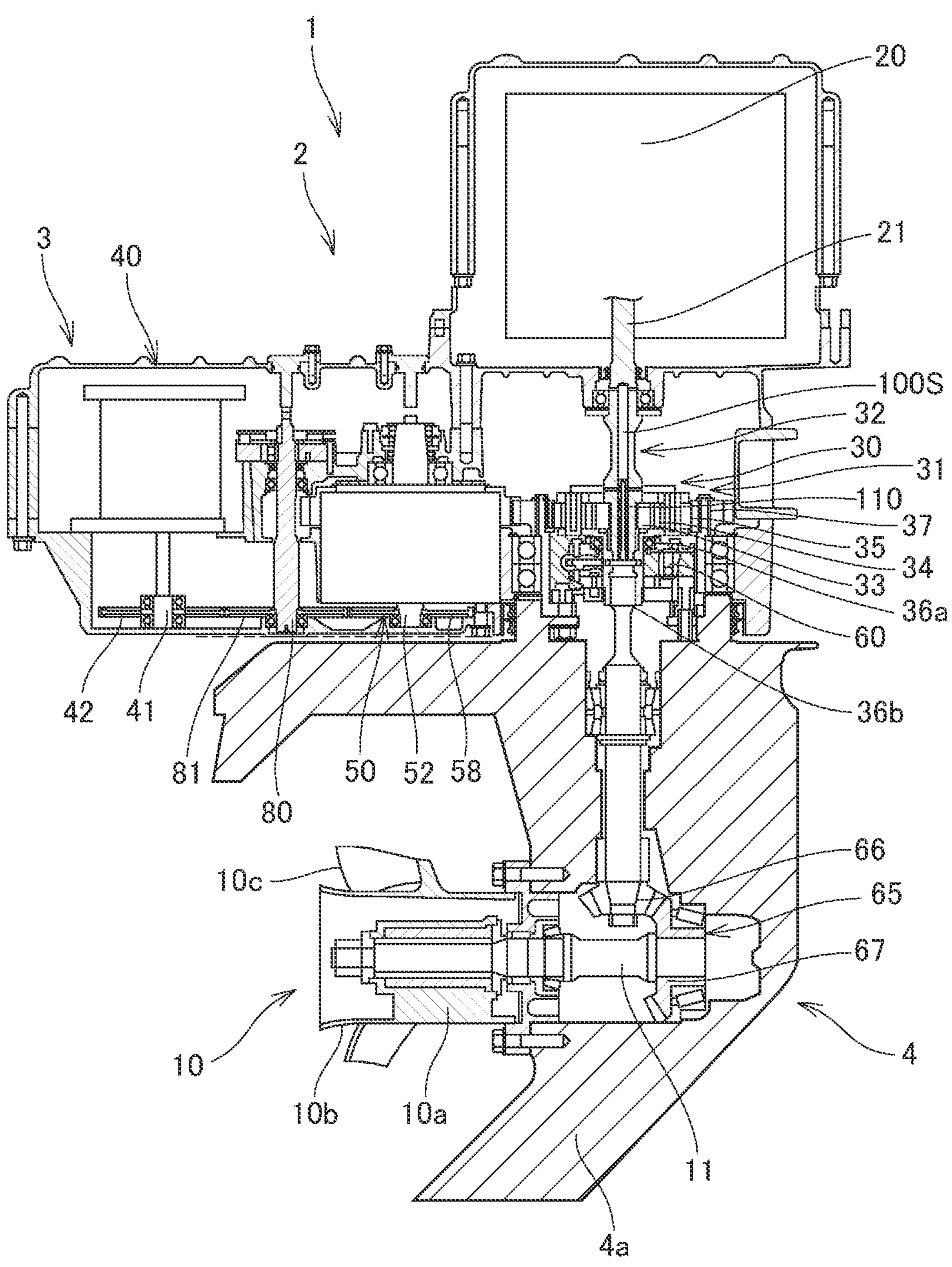
FIG. 1 is a side view of an outboard motor in an embodiment of the present invention.

FIG. 1 is a side view of an outboard motor 1 relating to an embodiment of the present invention.

The outboard motor 1 has a body case 2, a power motor 20 supported above the body case 2, and a propeller 10.

The body case 2 has a hollow structure made of a metallic material or a resin material.

The body case 2 includes an upper case 3 and a lower case 4.

The power motor 20 is arranged above a front part of the body case 2, so that an output shaft 21 of the power motor 20 extends in an up-down direction.

The upper case 3 forms a substantially rectangular shape that extends in a front-rear direction when seen in a side view. A power reduction gear 30 is housed inside the upper case 3, the power reduction gear 30 being positioned below the power motor 20.

The power reduction gear 30 is a device for reducing a rotational speed from the power motor 20, and the power reduction gear 30 is a device for transmitting this rotation speed to a power output shaft **36*b*. The power reduction gear 30 includes a power planetary gear mechanism 31**.

The power planetary gear mechanism 31 includes a power input shaft 32 connected to the output shaft 21 of the power motor 20.

A sun gear 33 is coaxially attached to the power input shaft 32. A plurality of planetary gears 34 is rotatably arranged on an outer peripheral side of the sun gear 33, the plurality of planetary gears 34 engaging with the sun gear 33.

An internal gear 35, with which each of the planetary gears 34 engage, is provided on the outside of the planetary gears 34, the internal gear 35 being fixed to the inside of the upper case 3.

A planetary carrier 36 is provided below the planetary gears 34, the planetary carrier 36 rotatably supporting the planetary gears 34. The planetary carrier 36 includes a planetary carrier support part **36*a* that extends downward. The planetary carrier support part 36*a* is rotatably supported by a bearing 75**.

The planetary carrier support part **36*a* is formed in a substantially cylindrical shape with the inside being hollow, and the power output shaft 36*b* is connected to the planetary carrier support part 36*a***.

The output shaft 21 of the power motor 20, and the power output shaft **36*b***, are arranged so as to be respectively coaxial.

A lubrication oil pump 60 is supported by a lower part of the power planetary gear mechanism 31, the lubrication oil pump 60 pressure-feeds lubrication oil to the power input shaft 32.

The power output shaft **36*b* is housed inside the lower case 4, and a propeller shaft 11 is rotatably supported below the lower case 4, the propeller shaft 11 extending downward substantially orthogonal to the power output shaft 36*b***.

A gear mechanism 65 engages with a lower end part of the power output shaft **36*b*, the gear mechanism 65 changing a rotation direction of the power output shaft 36*b* to a substantially orthogonal direction, and the gear mechanism 65 transmitting this rotation direction to the propeller shaft 11**.

The gear mechanism 65 is composed of a power shaft side bevel gear 66 attached to the power output shaft **36*b*, and a propeller shaft side bevel gear 67 attached to the propeller shaft 11, the propeller shaft side bevel gear 67 engaging with the power shaft side bevel gear 66**.

A rear end part of the propeller shaft 11 protrudes outward from a rear part of the lower case 4.

A propeller 10 is attached to the portion of the propeller shaft 11 that protrudes outward.

The propeller 10 is composed of a propeller support part 10*a* supported by the propeller shaft 11, a propeller case 10*b* that covers the propeller shaft 11, and a plurality of fins 10*c* provided on an outer peripheral surface of the propeller case 10*b*.

A steering fin 4*a* is integrally provided on a lower end part of the lower case 4, the steering fin 4*a* extending diagonally downward.

A steering reduction gear 50 is arranged at the rear of the power reduction gear 30.

In the steering reduction gear 50, a steering input shaft 52 arranged parallel to an axial direction of the power input shaft 32 of the power reduction gear 30 is provided.

A steering input gear 58 is attached to a lower end of the steering input shaft 52.

A steering motor 40 is arranged at the rear of the steering reduction gear 50. A rotating shaft 41 of the steering motor 40 is arranged substantially parallel to the steering input shaft 52. A steering output gear 42 is provided on a lower end of the rotating shaft 41 of the steering motor 40.

A support shaft 80 is provided between the steering motor 40 and the steering reduction gear 50, so that the support shaft 80 is substantially parallel to the rotating shaft 41 and the steering input shaft 52 of the steering motor 40 and the steering reduction gear 50, the support shaft 80 extending in an up-down direction. A transmission gear 81 is provided below the support shaft 80, the transmission gear 81 respectively engaging with the steering output gear 42 and the steering input gear 58.

Next, a lubrication structure of the power reduction gear 30 will be described.

Figure 2:
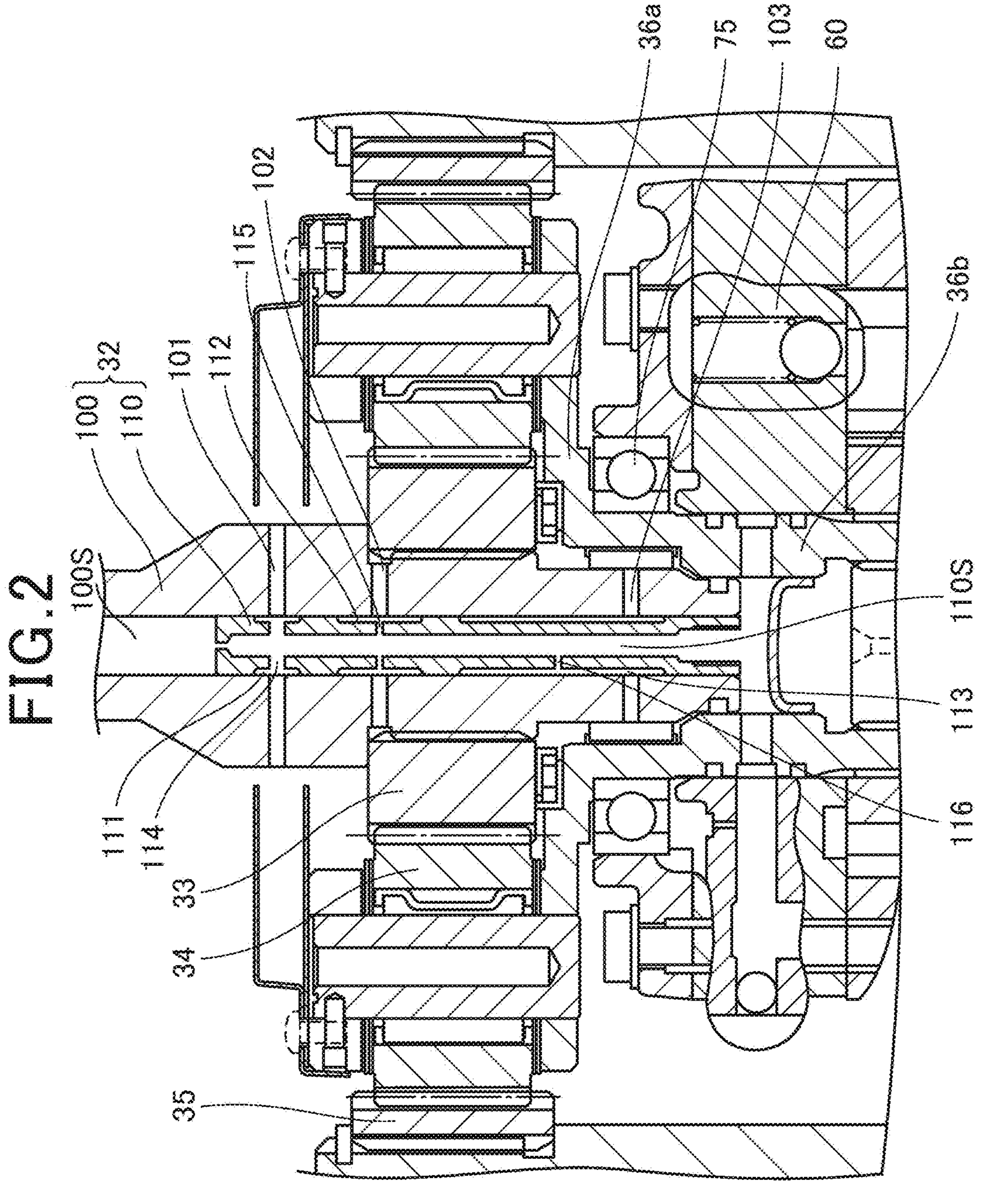
FIG. 2 is a side view of a power reduction gear.
Figure 3:
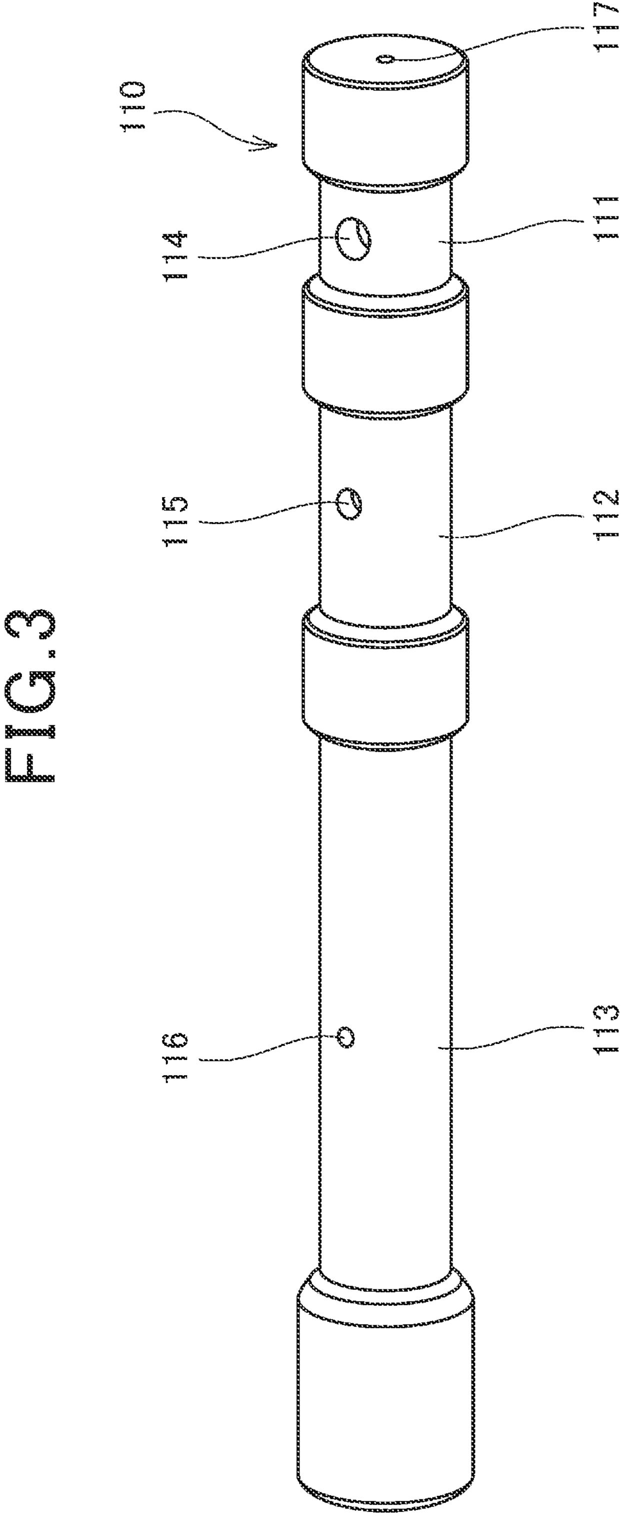
FIG. 3 is a perspective view of an internal member within the power reduction gear.

FIG. 2 is a side view of the power reduction gear 30. FIG. 3 is a perspective view of the internal member 110 within the power reduction gear 30.

As shown in FIG. 2, a supply passage of lubrication oil is provided in the power input shaft 32 of the power planetary gear mechanism 31.

The power input shaft 32 of the power planetary gear mechanism 31 is composed of an external member 100, and an internal member 110 disposed on the inside of the external member 100.

The external member 100 is a cylindrical member with a center being hollow. The internal member 110 is arranged by press-fitting or the like in a hollow part 100S of the external member 100. In the present embodiment, the external member 100, for example, is made of a carburized material or the like. In the present embodiment, the internal member 110, for example, is made of aluminum or carbon steel with a lower hardness than the external member 100.

As shown in FIG. 3, the internal member 110 is a cylindrical member, the internal member 110 provided with a plurality of entire circumferential groove parts 111, 112, 113. In the present embodiment, in the entire circumferential grooves of the internal member, an upper entire circumferential groove part 111, a middle entire circumferential groove part 112, and a lower entire circumferential groove part 113 are provided.

In the present embodiment, length dimensions of the upper entire circumferential groove part 111, the middle entire circumferential groove part 112, and the lower entire circumferential groove part 113 are formed so as to increase towards the bottom.

Horizontal holes 114, 115, 116, which are lubrication flow passages, are formed in the internal member 110, the horizontal holes 114, 115, 116 communicating with a hollow part 110S of the internal member 110 and the entire circumferential groove parts 111, 112, 113. Diameters of the horizontal holes 114, 115, 116 of the internal member 110 are formed so as to increase as a necessary amount of lubrication oil increases. In the present embodiment, diameters of the horizontal holes 114, 115, 116 are formed so as to increase towards the top.

Note that, there may be a plurality of the horizontal holes 114, 115, 116 of the internal member 110. For example, a plurality of holes is provided when a necessary amount of lubrication oil is large.

The lubrication flow passage from the lower entire circumferential groove part 113 communicates with the bearing 75 supported below the planetary carrier 36 (refer to FIG. 2). The lubrication flow passage from the middle entire circumferential groove part 112 communicates with the sun gear 33. The lubrication flow passage from the upper entire circumferential groove part 111 communicates to an upper part of the planetary gears 34, and the lubrication flow passage from the upper entire circumferential groove part 111 can drip lubrication oil from the upper part.

An orifice hole 117 is provided on an axial direction upper end of the internal member 110. Lubrication oil supply to the power motor 20 side is limited, by the orifice hole 117.

When the internal member 110 is press-fitted, the lubrication flow passages 101, 102, 103 are provided in the external member 100, the lubrication flow passages 101, 102, 103 having a horizontal hole shape extending in a radial direction, and the lubrication flow passages 101, 102, 103 communicating with the horizontal holes 114, 115, 116 provided in the internal member 110. In the present embodiment, the upper lubrication flow passage 101, the middle lubrication flow passage 102, and the lower lubrication flow passage 103 are provided. Two of each of the upper lubrication flow passage 101, the middle lubrication flow passage 102, and the lower lubrication flow passage 103 are provided.

Each of the lubrication flow passages is provided so as to be opposite one another in a radial direction. In the present embodiment, the upper lubrication flow passage 101 and the middle lubrication flow passage 102 are at linear positions in a radial direction with the corresponding horizontal holes 114, 115 of the internal member, namely, the upper lubrication flow passage 101 and the middle lubrication flow passage 102 are provided so that the horizontal holes 114, 115 of the internal member 110 and the lubrication flow passages 101, 102 of the external member 100 have the same height. The lower lubrication flow passage 103 is provided lower than the corresponding horizontal hole 116 of the internal member 110.

The lower lubrication flow passage 103 communicating with the lower entire circumferential groove part 113 of the internal member 110 communicates with the bearing 75 portion supported below the planetary carrier support part 36*a*. The middle lubrication flow passage 102 communicating with the middle entire circumferential groove part 112 communicates with the sun gear 33 portion. The upper lubrication flow passage 101 communicating with the upper entire circumferential groove part 111 communicates to an upper part of the planetary gear 54, and the upper lubrication flow passage 101 can drip lubrication oil from the upper part.

A lubrication oil pump 60 is provided on an outer peripheral side of the planetary carrier support part 36*a*.

The lubrication oil pump 60 pumps up lubrication oil stored in the body case 2, and the lubrication oil pump 60 supplies this lubrication oil to a lower end part of the internal member 110.

Next, an action of the present embodiment will be described.

First, when the power motor 20 starts, the output shaft 21 of the power motor 20 rotates, and the power input shaft 32 connected to the output shaft 21 rotates. The power input shaft 32 transmits power to the sun gear 33 within the power reduction gear 30, the sun gear 33 being one part of the planetary gear mechanism 31. In this way, power is transmitted to the plurality of planetary gears 34 engaging with the sun gear 33, and this power causes the planetary gears 34 to rotate. By having the planetary gears 34 rotate, the planetary carrier 36 supporting the planetary gears 34 rotates, and power is transmitted to the power output shaft 36*b*. Power transmitted from the power output shaft 36*b* is converted into a rotation of a front-rear direction, through the gear mechanism 65, and power is transmitted to the propeller shaft 11. By having the propeller shaft 11 rotate, the propeller 10 supported by the propeller shaft 11 also rotates. According to this, a propulsive force is provided to a ship hull to which the outboard motor 1 is attached, and the ship hull moves forward.

Next, a supply operation of lubrication oil will be described.

First, by driving the lubrication oil pump 60, lubrication oil stored in the body case 2 is pumped up, and this lubrication oil is supplied to a lower end part of the internal member 110.

Lubrication oil supplied to a lower end part of the internal member 110 is sent to the bearing 75 portion supported below the planetary carrier support part 36*a* through the lower lubrication flow passage 103 communicating with the lower entire circumferential groove part 113.

Moreover, lubrication oil supplied to the internal member is supplied to the sun gear 33 portion through the middle lubrication flow passage 102 communicating with the middle entire circumferential groove part 112.

Moreover, lubrication oil supplied to the internal member is supplied to an upper part of the planetary gears through the upper lubrication flow passage 101 communicating with the upper entire circumferential groove part 111.

In this way, by supplying lubrication oil to the inside of the internal member by the lubrication oil pump 60, lubrication oil can be supplied to each part of the power reduction gear 30.

Here, a high strength is required for the power input shaft 32 and the power output shaft 36*b* of the power reduction gear 30. Accordingly, if lubrication flow passages are formed in the power input shaft 32 and the power output shaft 36*b*, since it is necessary to process fine holes in members with a high strength, processing is difficult.

Accordingly, the lubrication flow passages provided in the power input shaft 32 and the power output shaft 36*b* become larger than necessary, and there is the fear that lubrication oil will be over-supplied. This is a factor that exerts an adverse influence on the necessary capacity, the fuel consumption, the cost and the like of the lubrication oil pump.

In the present embodiment, by setting as a double layer structure of the external member 100 with a high strength and the internal member 110 with a lower hardness than the external member 100, the size of lubrication flow passages can be controlled by the internal member 110 that is easy to process.

In this way, a supply amount of lubrication oil can be controlled, and it becomes possible to attempt a reduction in size, fuel consumption, cost and the like of the lubrication oil pump 60. Moreover, the internal member 110 is covered by the external member 100. Accordingly, a supply amount of lubrication oil can be controlled, while maintaining strength.

As stated above, in the outboard motor 1 of the present embodiment, in the outboard motor 1 having a power motor 20 and a power reduction gear 30, the output shaft 21 of the power motor 20 is connected to the power input shaft 32 of the power reduction gear 30, the power input shaft 32 includes an external member 100 and an internal member 110 housed inside the external member 100, the internal member 110 having a hollow part 110S forming an internal space extending in an axial direction, horizontal holes 114, 115, 116 are formed in the internal member 110, the horizontal holes 114, 115, 116 for communicating between the hollow part 110S and an outer peripheral surface of the internal member 110, the horizontal holes 114, 115, 116 communicate with lubrication flow passages 101, 102, 103 for communicating with a prescribed lubrication target portion of the power reduction gear 30, and the external member 100 and the internal member 110 are made of materials with a different hardness.

According to this configuration, rigidity by a member with a high hardness and moldability by a member with a low hardness can both be established.

In the outboard motor 1 of the present embodiment, the internal member 110 is made of a material lower in hardness than the external member 100.

According to this configuration, since the hardness of the internal member 110 is low, and the internal member 110 is easy to mold compared to the external member 100, a fine adjustment of a lubrication oil amount can be performed by the internal member 110.

In the outboard motor 1 of the present embodiment, the external member 100 and the internal member 110 are arranged with an axial direction of the external member 100 and an axial direction of the internal member 110 in a substantially vertical direction.

According to this configuration, by having the shafts extend in an up-down direction, lubrication oil can drip downward, and lubrication oil can be spread out, by using gravity.

In the outboard motor 1 of the present embodiment, a plurality of the horizontal holes 114, 115, 116 is provided, and flow passages by the plurality of the horizontal holes 114, 115, 116 are formed with different sizes.

According to this configuration, by performing a limitation of flow passages, a supply amount of lubrication oil can be regulated, and an appropriate amount of lubrication oil can be supplied to necessary portions.

In the outboard motor 1 of the present embodiment, flow passages by the plurality of horizontal holes 114, 115, 116 are formed so that a flow passage by an upper one of the horizontal holes 114, 115, 116 is larger than a flow passage by a lower one of the horizontal holes 114, 115, 116.

According to this configuration, by narrowing a lower passage where lubrication oil easily accumulates, a supply of lubrication oil more than necessary can be suppressed.

In the outboard motor 1 of the present embodiment, the lubrication flow passage for communicating with the horizontal holes 114, 115, 116 is arranged above a lubrication target portion.

According to this configuration, by dripping using weight and gravity from above, lubrication oil can be efficiently spread out to a lubrication target portion.

Other Embodiments

The above-stated embodiment simply shows one aspect of the present invention, and the above-stated embodiment can be arbitrarily modified and applied in a range that does not deviate from the content of the present invention.

The upper case 3 and the lower case 4 may be respectively made of the same material, or the upper case 3 and the lower case 4 may be respectively made of different materials.

In the present embodiment, the body case 2 is provided separately from the upper case 3 and the lower case 4. However, the shape of the body case 2 is not limited to this. Namely, the upper case 3 and the lower case 4 may be integrated, or the upper case 3 and the lower case 4 may be formed by combining a plurality of components.

In the present embodiment, a carburized material is used for the external member 100, and aluminum or carbon steel is used for the internal member 110. However, the material of the external member 100 and the material of the internal member 110 are not limited, if a prescribed strength can be obtained.

In the present embodiment, the horizontal holes 114, 115 of the upper entire circumferential groove part 111 and the middle entire circumferential groove part 112 of the internal member 110, and the upper lubrication flow passage 101 and the middle lubrication flow passage 102 of the external member 100, are provided at linear positions in a radial direction. However, the horizontal holes 114, 115, and the upper lubrication flow passage 101 and the middle lubrication flow passage 102, may not be linear, such as the horizontal hole 116 of the lower entire circumferential groove part 113 and the lower lubrication flow passage 103, if the lubrication flow passages are connected. Moreover, the horizontal hole 116 of the lower entire circumferential groove part 113 and the lower lubrication flow passage 103 may also be provided at linear positions in a radial direction.

The above embodiments support the following configurations.

(Configuration 1) In a lubrication mechanism including a rotating shaft, the rotating shaft includes an external member and an internal member housed inside the external member, the internal member having an internal space extending in an axial direction, a horizontal hole is formed in the internal member, the horizontal hole for communicating between the internal space and an outer peripheral surface of the internal member, the horizontal hole communicates with a lubrication flow passage for communicating with a prescribed lubrication target portion, and the external member and the internal member are made of materials with a different hardness.

According to this configuration, rigidity by a member with a high hardness and moldability by a member with a low hardness can both be established.

(Configuration 2) The lubrication mechanism described in Configuration 1, in which the internal member is made of a material lower in hardness than the external member.

According to this configuration, since the hardness of the internal member is low, and the internal member is easy to mold compared to the external member, a fine adjustment of a lubrication oil amount can be performed by the internal member.

(Configuration 3) The lubrication mechanism described in Configuration 1 or 2, in which the external member and the internal member are arranged with an axial direction of the external member and an axial direction of the internal member in a substantially vertical direction.

According to this configuration, by having the shafts extend in an up-down direction, lubrication oil can drip downward, and lubrication oil can be spread out, by using gravity.

(Configuration 4) The lubrication mechanism described in any one of the Configuration 1 to Configuration 3, in which a plurality of the horizontal holes is provided, and the plurality of the horizontal holes is formed with different sizes.

According to this configuration, by performing a limitation of flow passages, a supply amount of lubrication oil can be regulated, and an appropriate amount of lubrication oil can be supplied to necessary portions.

(Configuration 5) The lubrication mechanism described in Configuration 4, in which flow passages by the plurality of the horizontal holes are formed so a flow passage by an upper one of the horizontal holes is larger than a flow passage by a lower one of the horizontal holes.

According to this configuration, by narrowing a lower passage where lubrication oil easily accumulates, a supply of lubrication oil more than necessary can be suppressed.

(Configuration 6) The lubrication mechanism described in Configuration 1 to Configuration 5, in which the lubrication flow passage for communicating with the horizontal holes is arranged above a lubrication target portion.

According to this configuration, by dripping using weight and gravity from above, lubrication oil can be efficiently spread out to a lubrication target portion.

REFERENCE SIGNS LIST

1 outboard motor
2 body case
3 upper case
4 lower case
**4*a*** steering fin
10 propeller
**10*a*** propeller support part
**10*b*** propeller case
**10*c*** fin
11 propeller shaft
20 power motor
21 output shaft
30 power reduction gear
31 power planetary gear mechanism
31 planetary gear mechanism
32 power input shaft
33 sun gear
34 planetary gear
35 internal gear
36 planetary carrier
**36*a*** planetary carrier support part
**36*b*** power output shaft
40 steering motor
41 rotating shaft
42 steering output gear
50 steering reduction gear
52 steering input shaft
58 steering input gear

60 lubrication oil pump
65 gear mechanism
66 power shaft side bevel gear
67 propeller shaft side bevel gear
75 bearing
80 support shaft
81 transmission gear
100 external member
100S hollow part
101 upper lubrication flow passage
102 middle lubrication flow passage
103 lower lubrication flow passage
110 internal member
111 entire circumferential groove part
112 entire circumferential groove part
113 entire circumferential groove part
114 upper horizontal hole
115 middle horizontal hole
116 lower horizontal hole
117 orifice hole

What is claimed is:

1. A lubrication mechanism comprising a rotating shaft that includes an external member and an internal member, wherein the external member has a first internal space inside the external member, and is disposed so that an axial direction of the external member extends along a vertical direction, the internal member has a second internal space inside the internal member, and is disposed so that an axial direction of the internal member extends along the vertical direction, the internal member is housed inside the first internal space of the external member, wherein a plurality of lateral holes are formed in the internal member, each of the plurality of lateral holes extending in a direction perpendicular to the axial direction and communicating between the second internal space and an outer peripheral surface of the internal member, the plurality of lateral holes are arranged at positions spaced apart from each other along the axial direction of the internal member, and each of the plurality of lateral holes communicates with a lubrication flow passage for communicating with a predetermined lubrication target portion, and the external member and the internal member are made of materials with different hardnesses.

2. The lubrication mechanism according to claim 1, wherein the internal member is made of a material having a lower hardness than a material of the external member.

3. The lubrication mechanism according to claim 1, wherein the plurality of lateral holes is formed with different sizes.

4. The lubrication mechanism according to claim 3, wherein flow passages by the plurality of lateral holes are formed such that a flow passage by an upper one of the plurality of lateral holes is larger than a flow passage by a lower one of the plurality of lateral holes, the upper one of the lateral holes being at an upper side of the lower one of the lateral holes in the vertical direction.

5. The lubrication mechanism according to claim 4, wherein the lubrication flow passage for communicating with respective ones of the plurality of lateral holes is arranged upward than the predetermined lubrication target portion in the vertical direction.

6. The lubrication mechanism according to claim 1, the internal member includes, at the outer peripheral surface, a plurality of entire circumferential grooves which are provided in the axial direction of the internal member and each of which is a groove in which an entire periphery of the outer peripheral surface is recessed radially inward of the internal member, the plurality of lateral holes communicate between the second internal space and respective ones of the plurality of entire circumferential grooves.

7. The lubrication mechanism according to claim 6, in the axial direction of the internal member, a length dimension of an upper one of the plurality of entire circumferential grooves is larger than a length dimension of a lower one of the plurality of entire circumferential grooves, the upper one of the plurality of entire circumferential grooves being at an upper side of the lower one of the plurality of entire circumferential grooves in the vertical direction.

8. The lubrication mechanism according to claim 6, in the axial direction of the internal member, length dimensions of the plurality of entire circumferential grooves are formed so as to increase in order from a lower end side toward an upper end side of the internal member in the vertical direction.

9. An outboard motor comprising the lubrication mechanism according to claim 1.

10. A ship hull comprising the outboard motor according to claim 9, wherein the axial direction of the external member and the axial direction of the internal member are arranged substantially along an up-down direction with respect to a traveling direction of the ship hull.

* * * * *